(12) United States Patent
Geerlings et al.

(10) Patent No.: US 11,151,399 B2
(45) Date of Patent: Oct. 19, 2021

(54) ALIGNMENT SYSTEM

(71) Applicant: GENTEX CORPORATION, Zeeland, MI (US)

(72) Inventors: Kurtis L. Geerlings, Zeeland, MI (US); Winston D. Carr, Grand Rapids, MI (US); Adam R. Heintzelman, Grand Rapids, MI (US); Xiaoxu Niu, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 28 days.

(21) Appl. No.: 16/720,902

(22) Filed: Dec. 19, 2019

(65) Prior Publication Data

US 2020/0234069 A1    Jul. 23, 2020

Related U.S. Application Data

(60) Provisional application No. 62/793,396, filed on Jan. 17, 2019.

(51) Int. Cl.
*G06K 9/00* (2006.01)
*G02B 27/42* (2006.01)
(Continued)

(52) U.S. Cl.
CPC ........ *G06K 9/00919* (2013.01); *B60R 25/255* (2013.01); *G02B 26/106* (2013.01);
(Continued)

(58) Field of Classification Search
CPC ........... G06K 7/10732; G06K 7/10722; G06K 9/00335; G06K 7/10564; G06K 7/10584; G06K 7/10594; G06K 7/10603; G06K 7/10693; G06K 9/00228; G06K 9/00389; G06K 9/4604; G06K 9/00221;
(Continued)

(56) References Cited

U.S. PATENT DOCUMENTS

2005/0131607 A1\* 6/2005 Breed ................. B60R 21/0152
701/45
2014/0300839 A1   10/2014 Choe et al.
(Continued)

FOREIGN PATENT DOCUMENTS

EP        3032316 A2    6/2016
WO     1998008439 A1    3/1998

OTHER PUBLICATIONS

Eye Tracking in Advanced Interface Design by Robert Jacob (Year: 1995).*

(Continued)

*Primary Examiner* — Nizar N Sivji
(74) *Attorney, Agent, or Firm* — Price Heneveld LLP; Bradley D. Johnson

(57) ABSTRACT

An alignment system comprises a first diffractive optical element comprising an image and a laser source. The image is visible when the laser source is viewed from a desired field of view through the diffractive optical element. The laser source may be configured to produce a beam of light that will extend through at least a portion of the first diffractive optical element, thereby illuminating the image. The first diffractive optical element and the laser source may be disposed in a vehicle.

13 Claims, 3 Drawing Sheets

(51) Int. Cl.
  *B60R 25/25*  (2013.01)
  *G03H 1/00*  (2006.01)
  *G02B 26/10*  (2006.01)
  *B60R 11/00*  (2006.01)
  *G03H 1/22*  (2006.01)

(52) U.S. Cl.
  CPC ........... *G02B 27/4227* (2013.01); *G03H 1/00* (2013.01); *G03H 1/0005* (2013.01); *G06K 9/00255* (2013.01); *G06K 9/00604* (2013.01); *B60R 2011/0022* (2013.01); *G03H 2001/2292* (2013.01)

(58) Field of Classification Search
  CPC .. G06K 9/00342; G06K 9/00906; G06K 9/32; G06K 9/228; G06K 9/00919; G06K 9/00604; G06K 9/00255; B60R 2011/0022; B60R 1/00; B60R 11/04; B60R 2011/004; B60R 25/255; G02B 27/0093; G02B 27/48; G02B 27/0944; G02B 27/4205; G02B 27/0172; G02B 27/4233; G02B 5/32; G02B 27/1086; G02B 26/0808; G02B 27/0037; G02B 27/4227
  See application file for complete search history.

(56) References Cited

U.S. PATENT DOCUMENTS

| | | | |
|---|---|---|---|
| 2015/0009100 A1* | 1/2015 | Haneda | B60R 1/00 345/7 |
| 2015/0373322 A1* | 12/2015 | Goma | G01S 17/10 348/21 |
| 2016/0195430 A1* | 7/2016 | Sticherling | G01J 1/0204 250/349 |
| 2018/0172993 A1* | 6/2018 | Nill | G02B 27/0103 |
| 2019/0064539 A1* | 2/2019 | Chen | G03B 21/208 |
| 2019/0361256 A1* | 11/2019 | Miller | G02B 27/0172 |
| 2020/0151425 A1* | 5/2020 | Zhou | G06K 9/00906 |
| 2020/0393675 A1* | 12/2020 | Huang | G02B 27/0101 |

OTHER PUBLICATIONS

International Search Report dated Mar. 26, 2020 for corresponding PCT application PCT/US2019/067489, 2 Pages.
Written Opinion dated Mar. 26, 2020 for corresponding PCT application, PCT/US2019/067489, 3 Pages.

\* cited by examiner

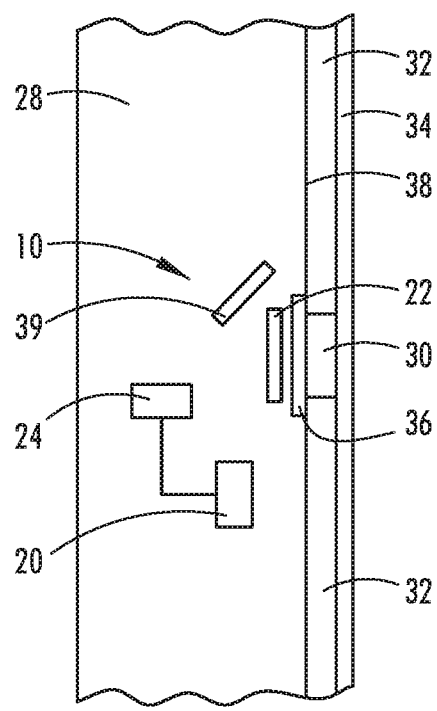
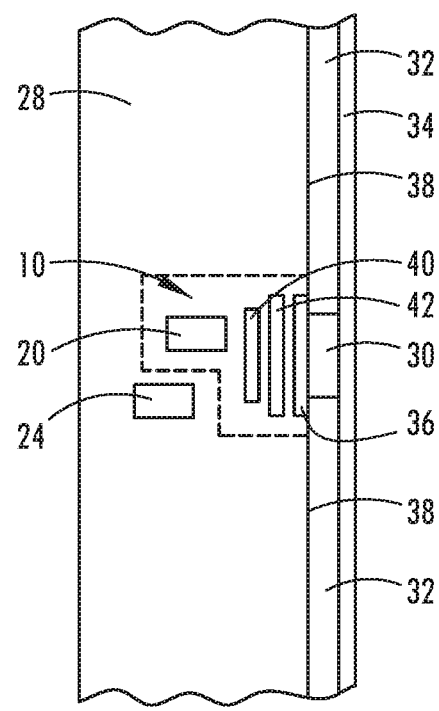
FIG. 3
FIG. 4
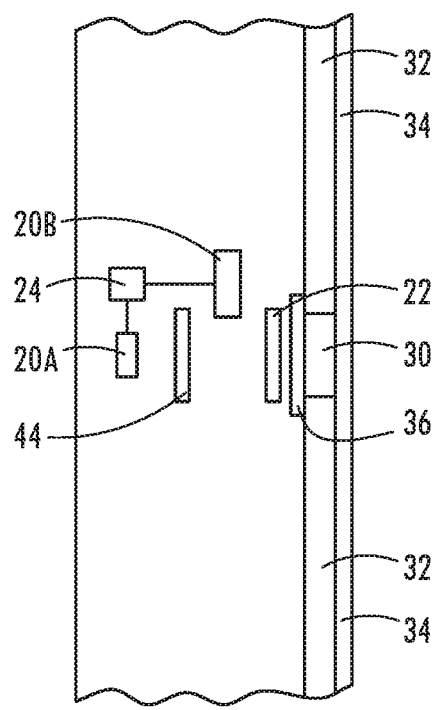
FIG. 5

ALIGNMENT SYSTEM

CROSS REFERENCE TO RELATED APPLICATIONS

This application claims the benefit of and priority to U.S. Provisional Patent Application No. 62/793,396, filed on Jan. 17, 2019, entitled System for Aligning an Object, the entire disclosure of which is hereby incorporated herein by reference.

FIELD OF THE DISCLOSURE

This disclosure relates generally to an alignment system, and in particular, to an alignment system configured to allow a user to properly position a part of his or her body in a desired field of view.

BACKGROUND

Many devices and systems now operate with user identification to ensure that only people with proper permissions use the devices or systems. Some of these devices and systems include biometric identification systems such as facial recognition or iris scanning as the means of user identification. However, with some systems, it may be difficult to ensure that the user is properly positioned within the field of view of a scanning apparatus associated with the biometric identification system in order to allow the scanning apparatus to capture the appropriate images.

SUMMARY

According to an aspect, an alignment system may comprise a first diffractive optical element comprising an image; and a laser source. The image may be visible when the laser source is viewed from a desired field of view through the diffractive optical element; and the laser source may be configured to produce a beam of light that will extend through at least a portion of the first diffractive optical element, thereby illuminating the image. The first diffractive optical element and the laser source may be disposed in a vehicle. The first diffractive optical element and the laser source may be disposed in a pillar of a vehicle. An aperture may be disposed in a wall of the pillar. The aperture may be disposed in a wall of the pillar, and the wall may be an exterior wall of the pillar. The aperture in the pillar may be aligned with the laser source and the first diffractive optical element so that the laser source is configured to send light through the first diffractive optical element and through the aperture.

The alignment system may further comprise a selectively transparent cover; and the selectively transparent cover may be disposed over the aperture. The selectively transparent cover may be configured to cover the aperture. The selectively transparent cover may be an electro-optic element. Additionally or alternatively, the alignment system may further comprise a low-transmissive cover, and the low-transmissive cover may be disposed over the aperture, and may be configured to cover the aperture.

The alignment system may further comprise a second diffractive optical element generally parallel to the first diffractive optical element. The second diffractive optical element may be disposed between the aperture and the laser source; and the laser source may be configured to project a laser beam through the first and second diffractive optical elements at a generally perpendicular angle. The alignment system may be in communication with a biometric scanning apparatus. The laser source may be an eye-safe laser source.

According to another aspect, a scanning system may comprise a first diffractive optical element having an image that appears when a laser source is viewed through the first diffractive optical element from a desired field of view; a laser source configured to generate a beam of light and shine the beam of light through the first diffractive optical element; and at least one scanning apparatus disposed to capture images from the desired field of view. In some aspects, the scanning apparatus may be a biometric scanning apparatus. In some aspects, the scanning apparatus may be an iris scanner. In some aspects, the scanning apparatus may be a facial recognition scanner.

The scanning system may further comprise a second diffractive optical element disposed generally parallel to the first diffractive optical element. The laser source may be an eye-safe laser source. The scanning system may be disposed within a vehicle. The scanning system may be disposed behind an aperture in a pillar on a vehicle. The scanning system may further comprise a selectively transparent element; and the selectively transparent element may be disposed within the pillar, and may be disposed to cover the aperture. The selectively transparent element may be an electro-optic device.

BRIEF DESCRIPTION OF THE DRAWINGS

FIG. 3 illustrates a schematic diagram of a second embodiment of an alignment system in accordance with this disclosure;

FIG. 4 illustrates a schematic diagram of a third embodiment of an alignment system in accordance with this disclosure;

FIG. 5 illustrates a schematic diagram of a fourth embodiment of an alignment system in accordance with this disclosure.

DETAILED DESCRIPTION

The present disclosure provides an alignment system, generally indicated at 10, for assisting in aligning an object within a desired field of view. In some embodiments, the object to be aligned may be a head or an eye of a user. In some embodiments, alignment system 10 may be configured to assist in aligning the head or eye of the user so that it is in the proper position to be scanned by a biometric imager such as an iris scanner or an imager used in facial recognition.

Figure 1:
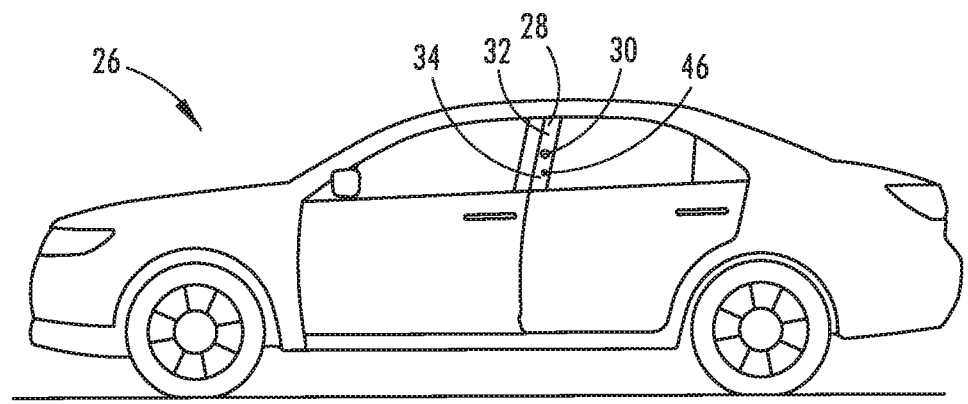
FIG. 1 illustrates a vehicle having an alignment system in accordance with this disclosure.

In some embodiments, alignment system 10 may be disposed in a vehicle 26, as shown in FIG. 1. Alignment system 10 may be disposed in a pillar 28 of vehicle 26. Alignment system 10 may be accessed through a wall of pillar 28. The wall of pillar 28 may be an exterior wall. Alignment system 10 may be disposed in one of an A pillar, a B pillar, a C pillar or another pillar of vehicle 26. An aperture or opening 30 in a wall of pillar 28 may be aligned with alignment system 10 in such a way as to allow a user to look through aperture 30 to correctly align the user's eye or face to be in the proper position for scanning by the biometric imager. Alignment system 10 may assist in properly aligning a user's iris or face for the biometric scanner by providing visual feedback to allow the user to know whether their iris or face is in the correct position.

In some embodiments, alignment system 10 may be used in conjunction with an authentication system and may be configured to assist a user to properly align his or her iris or face for biometric scanning as part of an authentication process. Authentication may be used to ensure that a verified user is accessing or using the vehicle. Authentication may allow a user to access the interior of the vehicle, start the ignition, and/or access or operate other vehicle functions.

Figure 2:
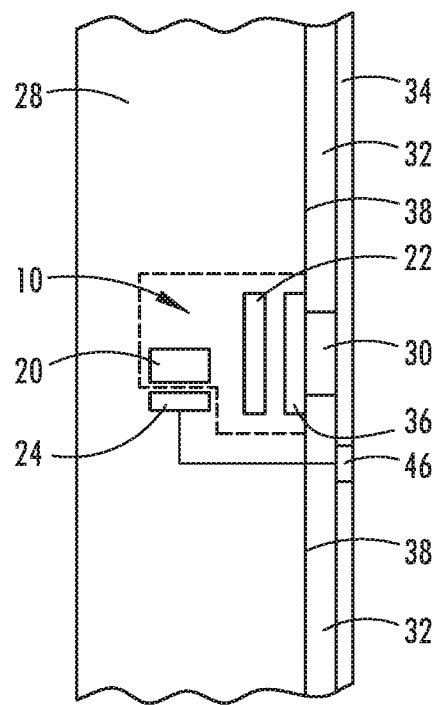
FIG. 2 illustrates a schematic diagram of a first embodiment of an alignment system in accordance with this disclosure.

In some embodiments, alignment system 10 may comprise at least one laser source 20 and at least one diffractive optical element 22 through which the laser source 20 may be viewed, as shown in FIGS. 2-4. Laser source 20 may be a device configured to produce a laser beam upon activation. Diffractive optical element 22 may be a film or other element configured to split or scatter light from an incoming laser beam into a predetermined pattern. Diffractive optical element 22 may be configured to display an image when a laser beam is viewed through diffractive optical element 22. To enable the user to more easily align the user's eye or face for scanning by the biometric imager, the user may look through aperture 30 and diffractive optical element 22 toward laser source 20.

Alignment system 10 may be configured to allow light from laser source 20 to shine through diffractive optical element 22 and project the image through aperture 30. A user may position his or her eye outside aperture and look through diffractive optical element 22 toward laser source 20. The image on diffractive optical element 22 may appear to the user in a desired size and format when the user's eye is properly aligned.

In some embodiments, alignment system 10 may work in conjunction with or may further comprise a scanning apparatus 24. Scanning apparatus 24 may comprise a biometric scanner. In some embodiments, scanning apparatus 24 may comprise an iris scanner, and may be configured to scan an iris of a user's eye. In some embodiments, scanning apparatus 24 may be a facial recognition scanner, and may be configured to scan all or a portion of a user's face. Scanning apparatus 24 may comprise or may be in communication with a processor (not shown). Scanning apparatus 24 may be configured to communicate data collected from the scanned image of the user's iris or face to the processor. Processor may be configured to compare the collected data on the scanned image to user data stored in a memory to determine whether the collected data matches the stored data. If the collected data matches the stored data, the user may be authenticated.

In some embodiments, scanning apparatus 24 may be disposed in proximity to laser source 20. When the user's eye is properly aligned, it may be in the field of view of scanning apparatus 24 and may be properly positioned to allow the scanning apparatus 24 to scan a desired part of user. The desired part of user may comprise one of the user's iris, the user's face, or a portion of the user's face.

In some embodiments, scanning apparatus 24 may be in communication with alignment system 10. Scanning apparatus 24 may be configured to capture and process images when alignment system 10 has been activated. The captured images may be compared with stored images. When the user's iris or face is in the proper field of view, the images captured by scanning apparatus 24 may be compared with images previously captured by scanning apparatus 24. In some embodiments, once an image has been matched to stored user data, laser source 20 may be deactivated and scanning apparatus 24 may stop scanning. However, in order to properly capture and process images of the desired body part of the user, the desired body part must be properly positioned in front of scanner. Alignment system 10 may assist with helping user to become properly positioned.

In some embodiments, when laser source 20 has been activated and user looks through diffractive optical element 22 toward laser source, an image may appear to the user due to the presence of diffractive optical element 22. If a user's eye is not properly aligned, the user may not see the image at all or may see only a portion of the image. By moving his or her head, the user may adjust his or her view of the image and the apparent size of the image. Once the user has moved his or her eye or head to properly see the image, the user's iris or face may be positioned in the desired field of view. The desired field of view may be the field of view of scanning apparatus 24. Once the user's iris or face is in the desired field of view, the user may remain stationary for a period of time to allow scanning apparatus 24 to scan the user's iris or face for authentication.

Laser source 20 may be an eye-safe laser source 20. In some embodiments, laser source 20 may produce light at wavelengths in the visible light portion of the spectrum, at wavelengths between about 400 and 700 nm. In some embodiments, laser source 20 may operate at a power level of less than 1 milliwatt. The optical intensity of laser source 20 may be low enough to prevent damaging the eyes of users looking into laser source 20.

In some embodiments, laser source 20 may be aimed generally toward aperture 30 and may be configured so that light from laser source 20 may travel through both diffractive optical element 22 and aperture 30, thereby allowing the user to view light from laser source 20 through diffractive optical element 22 and aperture 30. In some embodiments, laser source 20 may be configured so that, when activated, the laser beam travels through diffractive optical element 22 at an angle generally perpendicular to the plane of diffractive optical element 22.

In some embodiments, laser source 20 may be disposed within vehicle pillar 28 and may be aimed toward aperture 30 in exterior wall 32 of pillar 28. At least one diffractive optical element 22 may be disposed between laser source 20 and aperture 30 and aligned in such a way so as to allow users to view the light from laser source 20 through diffractive optical element 22.

In some vehicles, due to space or other constraints, it may be difficult or impossible to properly align laser source 20 and diffractive optical elements 22 with aperture 30 to allow light to travel directly from laser source 20 through diffractive optical element 22 and aperture 30 to be viewed by a user. Therefore, in some embodiments, at least one mirror or focusing lens 39 may be used to direct the light from laser source 20 toward diffractive optical element 22 and aperture 30, as shown in FIG. 3. In some embodiments, both at least one mirror and at least one focusing lens may be used to direct light from laser source 20 toward diffractive optical element 22. Light may be directed so that it arrives at diffractive optical element 22 in an angle generally perpendicular to the plane of diffractive optical element 22.

Diffractive optical element 22 may be configured to display a pattern or image when light from a laser source is viewed through diffractive optical element 22. In some embodiments, the pattern may be visible only when the eye of the user is properly aligned with respect to alignment system 10. In some embodiments, only a portion of the pattern may be visible if the eye is not properly aligned, and the entire pattern may be visible only when the eye of the user is properly aligned. The eye of the user may be properly aligned when it is in a desired field of view in relation to the alignment system 10. The desired field of view may be a field of view that is sensed by scanning apparatus 24.

In some embodiments, alignment system 10 may comprise two or more diffractive optical elements, as shown in FIG. 4. A first diffractive optical element 40 may be disposed in front of laser source 20, and a second diffractive optical element 42 may be disposed generally parallel to first diffractive optical element 40 and between first diffractive optical element 40 and aperture 30. Both first and second diffractive optical elements 40, 42 may be configured to be generally perpendicular to the laser beam when laser source 20 has been activated. In some embodiments, at least one mirror and/or at least one focusing lens 39 may be used to direct light from laser source 20 toward the two or more diffractive optical elements 40, 42. The at least one mirror and/or the at least one focusing lens may be arranged to direct the light so it is generally perpendicular to the plane of the two or more diffractive optical elements 40, 42 when it reaches the two or more diffractive optical elements 40, 42.

In some embodiments, each diffractive optical element 40, 42 may comprise an image that appears to the user when the light from laser source 20 is viewed through diffractive optical elements 40, 42. In some embodiments, the two or more diffractive optical elements 40, 42 may be in a spaced-apart relationship with respect to one another. A first image that appears due to the presence of the first diffractive optical element 40 may appear on a first focal plane, and a second image that appears due to the presence of second diffractive optical element 42 may appear on a second focal plane.

In some embodiments, different portions of a complete design may be on different diffractive optical elements 40, 42 and, therefore, on different focal planes. In some embodiments, each of the images may appear to be lined up with one another when the user's eye is properly aligned with respect to alignment system 10. For example, one image may be a circle and one may be a square. The user's eye may be properly aligned when the circle appears inside the square. In some embodiments, a first image on first diffractive optical element 40 may form a first portion of a complete figure and a second image on second diffractive optical element 42 may form a second portion of the complete figure. When the user's eye is properly aligned, the complete figure may appear. For example, the first image may be the right half of a circle and the second image may be the left half of a circle. When the user's eye is properly aligned and the user is viewing light from laser source 20 through first and second diffractive optical elements 40, 42, the complete circle may appear to the user.

In some embodiments, as the user moves his or her head, the projected image moves with it. In some embodiments, as the user moves his or her head, portions of the image may move in relation to one another. For example, as a user's head is moved, a portion of the image on a first focal plane may move toward or away from a portion of the image on a second focal plane. Thus, alignment system 10 gives immediate feedback to the user on the relative position of his or her head, and a user may move his or her head until the image appears complete. An image may be chosen such that the user can easily tell which way to move and will know when proper alignment has been achieved.

In some embodiments, diffractive optical element 42 may have two images; the first image having a first polarization and the second image having a second polarization different from the first polarization. The first and second polarizations may be generally orthogonal to one another. Incoming light from laser source 20 may be polarized differently from the first and second polarizations. For example, light from laser source 20 may be polarized at about 45 degrees relative to the polarizations of each of the two images. The images produced by the two different polarizations may be aligned by a user in the same way as images from two different diffractive optical elements 42.

In some embodiments, the image may be a shape or figure, a logo or design, or a word or a phrase. In some embodiments, the image may appear in different colors as the location of the user's eye changes, and the color change may function as a feedback mechanism for the user. For example, alignment system 10 may comprise a first laser source 20 configured to project light having a first color and a second laser source 20 configured to project light having a second color different from the first color. A user may see an image in the first color when the user is out of range of alignment system 10, and may see the image in the second color when the user is in range.

In some embodiments, alignment system 10 may comprise two or more laser sources 20. Output beams from each of the two or more laser sources 20 may be disposed on top of one another as shown in FIG. 5. For example, alignment system 10 may comprise two laser sources, a first laser source 20A and a second laser source 20B, and the beams from the two laser sources may be disposed on top of one another. This may be done by, for example, having a mirror 44 configured to transmit a first wavelength and to reflect a second wavelength. The mirror may allow a laser beam from first laser source 20A comprising light of the first wavelength to pass through it, and may reflect a laser beam from second laser source 20B comprising light of the second wavelength. Laser sources 20A and 20B of alignment system 10 may be configured to project two images, each image having a different color from the other. Scanning apparatus 24 may be disposed in proximity to both first laser source 20A and second laser source 20B and may be in communication with alignment system 10.

In some embodiments, an aperture or opening 30 may be in an exterior wall 32 of vehicle pillar 28. In some embodiments, a transparent surface 34 may cover aperture 30. In some embodiments, transparent surface 34 may cover the exterior surface of exterior wall 32 of pillar 28. Transparent surface 34 may protect elements of alignment system 10 from exposure to inclement weather. Transparent surface 34 may also provide an aesthetically pleasing cover for alignment system 10, and may make it less visible.

In some embodiments, alignment system 10 may further comprise a cover 36 that may shield components of alignment system 10 from view when alignment system 10 is not in use. Cover 36 may comprise a selectively transparent element. Selectively transparent element 36 may extend over pillar aperture 30 between exterior pillar wall 32 and the at least one diffractive optical element 22. In some embodiments, selectively transparent element 36 may be disposed against an interior surface 38 of exterior pillar wall 32.

In some embodiments, selectively transparent element 36 may be an electro-optic element. In some embodiments, selectively transparent element 36 may be transparent when alignment system 10 is being used to align the user's eye or head. In some embodiments, selectively transparent element 36 may be opaque or nearly opaque when alignment system 10 is not being used. In some embodiments, selectively transparent element 36 may be in an opaque or nearly opaque mode when vehicle ignition has been started or when vehicle 26 is moving. In some embodiments, selectively transparent element 36 may be placed in a transparent mode in response to user input on a button or switch, or by receiving a wired or wireless signal. In some embodiments, placing selectively transparent element 36 into a transparent mode may activate laser source 20. In some embodiments, activating alignment system 10 may place selectively transparent element 36 into a transparent mode.

In some embodiments, cover 36 may comprise a low-transmission element. Low-transmission element 36 may appear opaque from the outside. Light from laser source 20 may be capable of shining through low transmission element 36 when laser source is active, and the image generated by diffractive optical element 42 may be visible to the viewer. However, when laser source is off, low transmission element 36 may hide alignment system 10.

Figure 6:
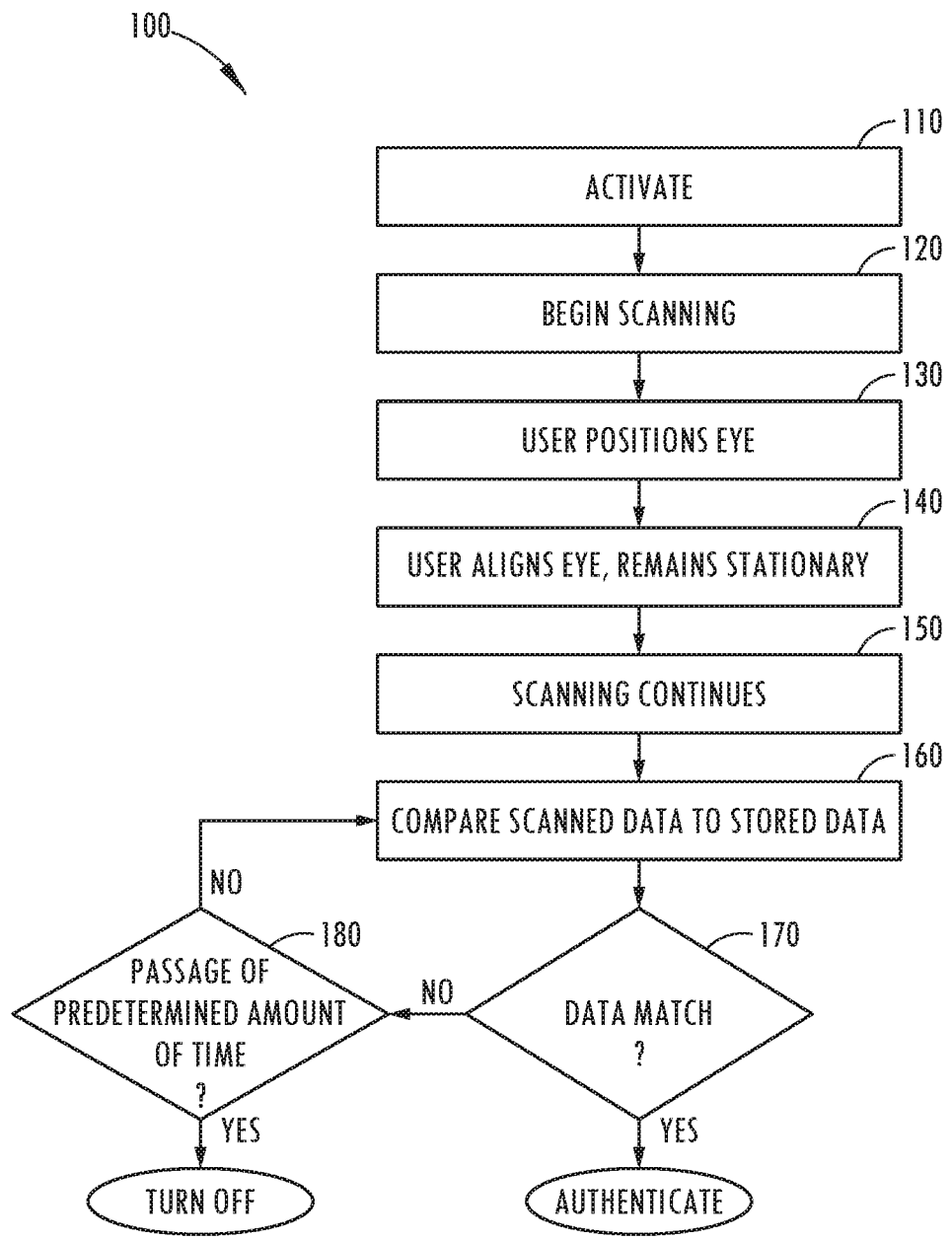
FIG. 6 is a flow chart illustrating a method of using the alignment system of this disclosure.

A method 100 of using alignment system 10 with a biometric scanning apparatus 24 is shown in FIG. 6. The method begins in step 110 with the activation of alignment system 10. In some embodiments, the activation may be done through a user input. In some embodiments, alignment system may further comprise a proximity sensor 46, and activation may be based upon the sensing, by proximity sensor 46, of an object in proximity to proximity sensor 46. Upon activation, alignment system 10 may ensure that selectively transparent element is in a transparent state. In addition, upon the activation of alignment system 10, laser source 20 may be activated, and may produce a laser beam aimed toward diffractive optical element 22. Diffractive optical element 22 may be configured such that, when the laser beam strikes it, an image may appear to a viewer if the viewer is properly positioned. In step 120, once alignment system has been activated, scanning apparatus 24 may begin scanning. In some embodiments, scanning apparatus 24 may begin scanning only upon a determination based on data from proximity sensor 46 that an object is within a predetermined distance of proximity sensor 46. Once activated, scanning apparatus 24 may communicate any data collected to the processor.

In step 130, a user places one of his or her eyes in front of aperture 30 and looks through both aperture 30 and diffractive optical element 22 toward laser source 20. If the user's eye is not properly aligned, no image or only a partial image may appear to user. The user may move his or her eye until the user sees the desired image as shown in step 140. Once the desired image appears, the user's eye is properly positioned. Once the user's eye has been properly positioned, the user may remain stationary for a sufficient amount of time to allow scanning apparatus 24 to scan the user's iris or face. In step 150, scanning apparatus 24 scans and collects data, and communicates the collected data to the processor. In step 160, the processor may compare the data received from scanning apparatus 24 to data stored in the processor. In step 170, the processor determines whether there is a match between the stored data and the received data. If a user's iris or face is not aligned properly, there may not be a match. Similarly, if data on the user's iris or face has not been stored in processor, there will not be a match. If there is no match, scanning apparatus 24 may continue to scan. If there is a match, the user is authenticated. In some embodiments, as shown in step 180, alignment system 10 and scanning apparatus 24 may be configured to turn off if a predetermined period of time elapses without a match.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

The invention claimed is:

1. An alignment system, comprising:
   a first diffractive optical element comprising an image; and
   a laser source positioned to, upon activation, produce a beam of light that will extend through at least a portion of the first diffractive optical element;
   wherein the first diffractive optical element and the laser source are disposed in a pillar of a vehicle;
   wherein an aperture is disposed in an exterior wall of the pillar; and
   wherein the aperture in the pillar is aligned with the laser source and the first diffractive optical element so that the laser source is configured to send light through the first diffractive optical element and through the aperture; and
   wherein the image is visible when the laser source is viewed from a desired field of view exterior to the pillar and through the first diffractive optical element;
   wherein, upon activation of the alignment system:
      a scanning apparatus is configured begin scanning, wherein the object to be scanned is an eye of a user;
      the user positions their eye so the image is visible to the user's eye;
      the scanning apparatus continues scanning once the user's eye has been positioned;
      a processor compares data from the scan of the user's eye to stored data; and
      upon a determination that the scanned data matches the stored data, the processor authenticates the user.

2. The alignment system of claim 1, further comprising a selectively transparent cover;
   wherein the selectively transparent cover is disposed over and configured to cover the aperture.

3. The alignment system of claim 2, wherein the selectively transparent cover is an electro-optic element.

4. The alignment system of claim 1, wherein the laser source is configured to produce a beam of light that extends from the laser source through the first diffractive optical element in a generally perpendicular orientation as it passes through the first diffractive optical element.

5. The alignment system of claim 1, further comprising a second diffractive optical element;
   wherein second diffractive optical element is generally parallel to the first diffractive optical element;
   wherein the second diffractive optical element is disposed between the aperture and the first diffractive optical element; and
   wherein the laser source is configured to project a laser beam through the first and second diffractive optical elements at a generally perpendicular angle.

6. The alignment system of claim 1, wherein the laser source is an eye-safe laser source.

7. The alignment system of claim 1, further comprising at least one mirror or focusing lens configured to direct light from the laser source toward the first diffractive optical element.

8. A scanning system comprising:
- a first diffractive optical element disposed within a pillar of a vehicle and having an image that appears when light from a laser source is viewed through the first diffractive optical element from a desired field of view exterior to the vehicle;
- a laser source configured to generate a beam of light and shine the beam of light through the first diffractive optical element; and
- at least one scanning apparatus disposed to capture images from the desired field of view;
- wherein the first diffractive optical element and the laser source are disposed in a pillar of a vehicle;
- wherein the scanning system is disposed behind an aperture in the pillar of the vehicle; and
- wherein the aperture in the pillar is aligned with the laser source and the first diffractive optical element so that the laser source is configured to send light through the first diffractive optical element and through the aperture;
- wherein, upon activation of the scanning system:
  - a scanning apparatus is configured begin scanning, wherein the object to be scanned is an eye of a user;
  - the user positions their eye so the image is visible;
  - the scanning apparatus continues scanning once the user's eye has been positioned;
  - a processor compares data from the scan of the user's eye to stored data; and
  - upon a determination that the scanned data matches the stored data, the processor authenticates the user.

9. The scanning system of claim 8, wherein the scanning apparatus is an iris scanner.

10. The scanning system of claim 8, further comprising a second diffractive optical element disposed generally parallel to the first diffractive optical element.

11. The scanning system of claim 8, wherein the laser source is an eye-safe laser source.

12. The scanning system of claim 8, further comprising a selectively transparent element; wherein the selectively transparent element is disposed within the pillar and is disposed to cover the aperture.

13. The scanning system of claim 12, wherein the selectively transparent element is an electro-optic device.

* * * * *